(12) United States Patent
Sawyers-Abbott

(10) Patent No.: US 11,371,374 B2
(45) Date of Patent: Jun. 28, 2022

(54) SEAL RUNNER FLOW DAMPER

(71) Applicant: Raytheon Technologies Corporation, Farmington, CT (US)

(72) Inventor: Nigel David Sawyers-Abbott, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 62 days.

(21) Appl. No.: 16/935,285

(22) Filed: Jul. 22, 2020

(65) Prior Publication Data
US 2022/0025776 A1 Jan. 27, 2022

(51) Int. Cl.
*F01D 25/12* (2006.01)
*F01D 11/00* (2006.01)
*F16J 15/324* (2016.01)

(52) U.S. Cl.
CPC .......... *F01D 11/003* (2013.01); *F01D 25/12* (2013.01); *F16J 15/324* (2013.01); *F05D 2220/32* (2013.01); *F05D 2240/55* (2013.01); *F05D 2260/20* (2013.01)

(58) Field of Classification Search
CPC ....... F01D 11/003; F01D 25/12; F16J 15/324; F05D 2220/32; F05D 2240/55; F05D 2260/20
USPC ......................................................... 138/46
See application file for complete search history.

(56) References Cited

U.S. PATENT DOCUMENTS

| | | | | |
|---|---|---|---|---|
| 2,889,117 A | * | 6/1959 | Wimpress | ............. F01D 17/141 239/124 |
| 3,922,113 A | * | 11/1975 | Turner | ..................... F04F 5/48 417/79 |
| 4,011,894 A | * | 3/1977 | Barnes | ...................... F15D 1/02 138/46 |
| 4,072,008 A | * | 2/1978 | Kenworth | .............. F02K 3/075 60/262 |
| 4,159,888 A | | 7/1979 | Thompson | |
| 4,192,466 A | * | 3/1980 | Tanasawa | .......... F02M 51/0671 239/464 |
| 4,309,145 A | * | 1/1982 | Viola | ..................... F01D 11/025 415/173.7 |
| 4,406,459 A | * | 9/1983 | Davis | ................... F16J 15/3404 277/401 |
| 4,406,460 A | * | 9/1983 | Slayton | ................. F16J 15/164 277/401 |
| 4,928,978 A | * | 5/1990 | Shaffer | ................. F01D 25/183 277/401 |
| 5,067,825 A | * | 11/1991 | Vance | ................... F16C 27/045 384/99 |

(Continued)

Primary Examiner — J. Todd Newton, Esq.
Assistant Examiner — Theodore C Ribadeneyra
(74) Attorney, Agent, or Firm — Carlson, Gaskey & Olds, P.C.

(57) ABSTRACT

A gas turbine engine component includes a first member, a second member rotatable relative to the first member about an axis, and a seal assembly that includes a seal supported by the first member and a seal runner that rotates with the second member relative to the seal. The seal runner includes at least one internal passage to direct cooling fluid flow through the seal runner. A restriction is associated with the at least one internal passage to restrict flow through the at least one internal passage in response to an engine condition.

22 Claims, 3 Drawing Sheets

(56) References Cited

U.S. PATENT DOCUMENTS

| | | | | |
|---|---|---|---|---|
| 5,149,206 | A * | 9/1992 | Bobo | F01D 25/164 248/562 |
| 5,464,227 | A * | 11/1995 | Olson | F16J 15/3404 277/400 |
| 5,622,438 | A * | 4/1997 | Walsh | F01D 25/162 384/624 |
| 5,658,127 | A * | 8/1997 | Bond | F01D 25/183 277/399 |
| 6,109,617 | A * | 8/2000 | Laney | F16J 15/3484 277/369 |
| 6,328,072 | B1 * | 12/2001 | Mahe | F16L 55/128 137/118.04 |
| 6,652,224 | B2 * | 11/2003 | Mulloy | F01D 17/167 415/158 |
| 7,165,936 | B2 * | 1/2007 | Elpern | F01D 17/141 415/155 |
| 7,984,911 | B2 * | 7/2011 | Dobek | F16J 15/3468 277/399 |
| 8,167,494 | B2 | 5/2012 | Gibbons | |
| 8,201,713 | B2 * | 6/2012 | Bourque | B65D 83/44 222/402.1 |
| 8,251,100 | B2 * | 8/2012 | Faraon Chaul Huerta | F16K 17/30 138/46 |
| 9,546,560 | B2 * | 1/2017 | Larson | F01D 11/005 |
| 10,352,193 | B2 * | 7/2019 | Smedresman | F16C 27/02 |
| 10,352,456 | B2 * | 7/2019 | Amador | F16J 15/342 |
| 10,662,811 | B2 * | 5/2020 | Davis | F16C 27/045 |
| 10,830,078 | B2 * | 11/2020 | Fiore | F01D 25/183 |
| 11,131,388 | B2 * | 9/2021 | Peters | F01D 25/183 |
| 2003/0205049 | A1 * | 11/2003 | Anderson | F02C 3/32 60/782 |
| 2006/0064988 | A1 * | 3/2006 | Ingistov | F01D 11/001 60/805 |
| 2009/0211246 | A1 * | 8/2009 | McEwan | F02D 9/06 60/602 |
| 2012/0128467 | A1 * | 5/2012 | Ruthemeyer | F02C 7/185 415/115 |
| 2013/0004109 | A1 * | 1/2013 | Metzger | F16C 33/583 384/473 |
| 2015/0130138 | A1 * | 5/2015 | Zheng | F01D 11/003 277/307 |
| 2015/0152746 | A1 * | 6/2015 | Maret | F16J 15/324 415/1 |
| 2015/0337852 | A1 * | 11/2015 | Klingler | F01D 11/16 415/170.1 |
| 2015/0345376 | A1 * | 12/2015 | Ibaraki | F02B 39/005 60/605.1 |
| 2016/0369641 | A1 * | 12/2016 | Davies | F01D 11/006 |
| 2017/0016350 | A1 * | 1/2017 | Miller | F01D 25/183 |
| 2017/0051834 | A1 * | 2/2017 | Webster | F16J 15/447 |
| 2018/0073639 | A1 * | 3/2018 | Webster | F16J 15/164 |
| 2020/0131936 | A1 | 4/2020 | Amador et al. | |

* cited by examiner

SEAL RUNNER FLOW DAMPER

BACKGROUND

This application relates to a gas turbine engine that includes a component comprising a seal runner with a flow damper.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate.

In one known type of gas turbine engine, there are at least two turbine rotors, each driving a compressor rotor. These turbine rotors are supported by a series of bearings. The bearings require lubricant. Various seals near the rotating shafts contain oil within bearing compartments, which include the bearings and seals. During operation of the engine, the seals maintain compartment pressures and keep lubricating oil inside the various compartments. During high-speed conditions, the seals can be subjected to increased temperatures. It is a challenge to provide cooling and maintain acceptable levels of oil containment in the bearing compartment for such seals.

SUMMARY

In a featured embodiment, a gas turbine engine component includes a first member, a second member rotatable relative to the first member about an axis, and a seal assembly that includes a seal supported by the first member and a seal runner that rotates with the second member relative to the seal. The seal runner includes at least one internal passage to direct cooling fluid flow through the seal runner. A restriction is associated with the at least one internal passage to restrict flow through the at least one internal passage in response to an engine condition. In another embodiment according to the previous embodiment, In another embodiment according to the previous embodiment, the restriction comprises a resilient member.

In another embodiment according to any of the previous embodiments, a damper is associated with the resilient member, wherein the resilient member moves the damper from an initial position to a restricted position to reduce a flow rate of fluid flowing through the at least one internal passage in response to the engine condition.

In another embodiment according to any of the previous embodiments, the second member rotates a first speed under a low-speed engine operating condition and rotates at a second speed higher than the first speed under a high-speed engine operating condition, and wherein the engine condition corresponds to the high-speed engine operating condition such that fluid exits an outlet of the at least one internal passage at a first flow rate when the damper is in the initial position and wherein the fluid exits the outlet at a second flow rate less than the first flow rate when the damper is in the restricted position.

In another embodiment according to any of the previous embodiments, the resilient member is enclosed within a pocket formed within the seal runner.

In another embodiment according to any of the previous embodiments, the resilient member includes a first end held fixed within the pocket and a second end that is associated with the damper.

In another embodiment according to any of the previous embodiments, the resilient member is biased to the initial position, and wherein the damper moves to the restricted position when a rotational speed of the second member overcomes a biasing force of the resilient member.

In another embodiment according to any of the previous embodiments, the damper blocks a portion of the at least one internal passage when in the restricted position to reduce a cross-sectional area of the at least one internal passage from a first area to a second area less than the first area.

In another embodiment according to any of the previous embodiments, a stop prevents the damper from completely blocking the at least one internal passage.

In another embodiment according to any of the previous embodiments, the at least one internal passage comprises at least a first passage at a radially inner surface of the seal runner, and a second passage having a first end in fluid communication with the first passage and a second end in fluid communication with a radially outer surface of the seal runner, and wherein the pocket is open to the second passage at a location between the first and second ends.

In another embodiment according to any of the previous embodiments, at least one bearing supports a shaft for rotation about an engine axis, wherein the at least one bearing is positioned within a bearing compartment, and wherein the seal assembly provides sealing for the bearing compartment.

In another featured embodiment, a gas turbine engine component includes at least one bearing to support a shaft for rotation about an engine axis, wherein the at least one bearing is positioned within a bearing compartment, and a seal assembly to provide sealing for the bearing compartment. The seal assembly includes a seal supported by a first member and a seal runner supported by a second member that rotates relative to the first member about the engine axis. The seal runner includes at least one internal passage to direct cooling fluid flow through the seal runner, and a restriction associated with the at least one internal passage to restrict flow through the at least one internal passage in response to an engine condition.

In another embodiment according to any of the previous embodiments, the restriction comprises a resilient member.

In another embodiment according to any of the previous embodiments, a damper is associated with the resilient member, wherein the resilient member moves the damper from an initial position to a restricted position to reduce a flow rate of fluid flowing through the at least one internal passage in response to the engine condition.

In another embodiment according to any of the previous embodiments, the resilient member is enclosed within a pocket formed within the seal runner, and wherein the resilient member includes a first end held fixed within the pocket and a second end that is associated with the damper.

In another embodiment according to any of the previous embodiments, the resilient member is biased to the initial position, and wherein the damper moves to the restricted position when a rotational speed of the second member overcomes a biasing force of the resilient member, and including a stop to prevent the damper from completely blocking the at least one internal passage when in the restricted position.

In another embodiment according to any of the previous embodiments, the second member rotates a first speed under a low-speed engine operating condition and rotates at a second speed higher than the first speed under a high-speed engine operating condition, and wherein the engine condition corresponds to the high-speed engine operating condition such that fluid exits an outlet of the at least one internal passage at a first flow rate when the damper is in the initial position and wherein the fluid exits the outlet at a second flow rate less than the first flow rate when the damper is in the restricted position.

In another featured embodiment, a method includes providing a seal assembly that includes a seal supported by a first member and a seal runner supported by a second member that rotates relative to the first member about an engine axis; forming at least one internal passage in the seal runner to direct cooling fluid flow through the seal runner; and associating a restriction with the at least one internal passage to restrict flow through the at least one internal passage in response to an engine condition.

In another embodiment according to any of the previous embodiments, the restriction comprises a resilient member and a damper associated with the resilient member, and including using the resilient member to move the damper from an initial position to a restricted position to reduce a flow rate of fluid flowing through the at least one internal passage in response to the engine condition.

In another embodiment according to any of the previous embodiments, the second member rotates a first speed under a low-speed engine operating condition and rotates at a second speed higher than the first speed under a high-speed engine operating condition, and wherein the engine condition corresponds to the high-speed engine operating condition such that fluid exits an outlet of the at least one internal passage at a first flow rate when the damper is in the initial position and wherein the fluid exits the outlet at a second flow rate less than the first flow rate when the damper is in the restricted position.

These and other features may be best understood from the following drawings and specification.

DETAILED DESCRIPTION

Figure 1:
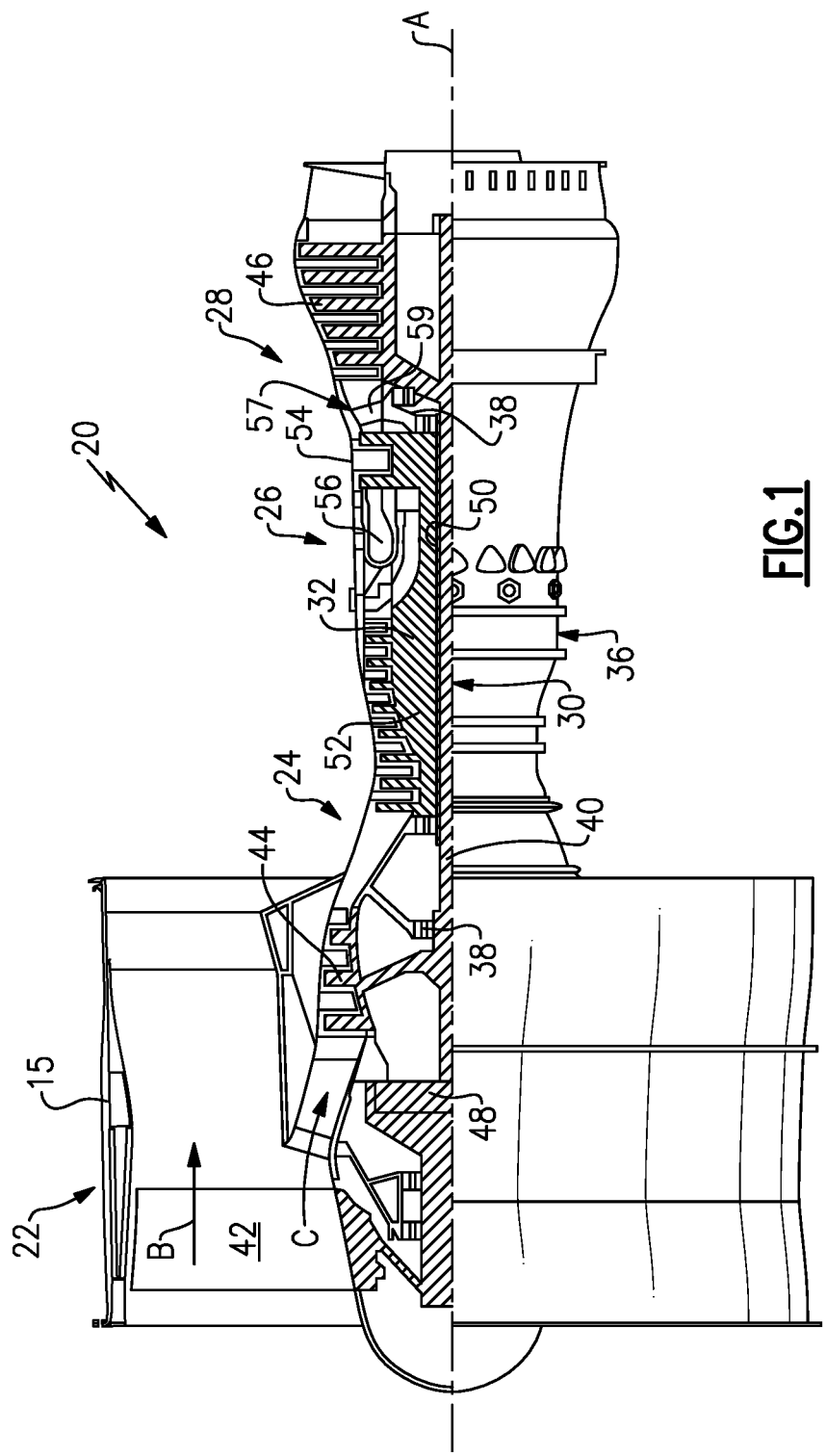
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1150 ft/second (350.5 meters/second).

Figure 2:
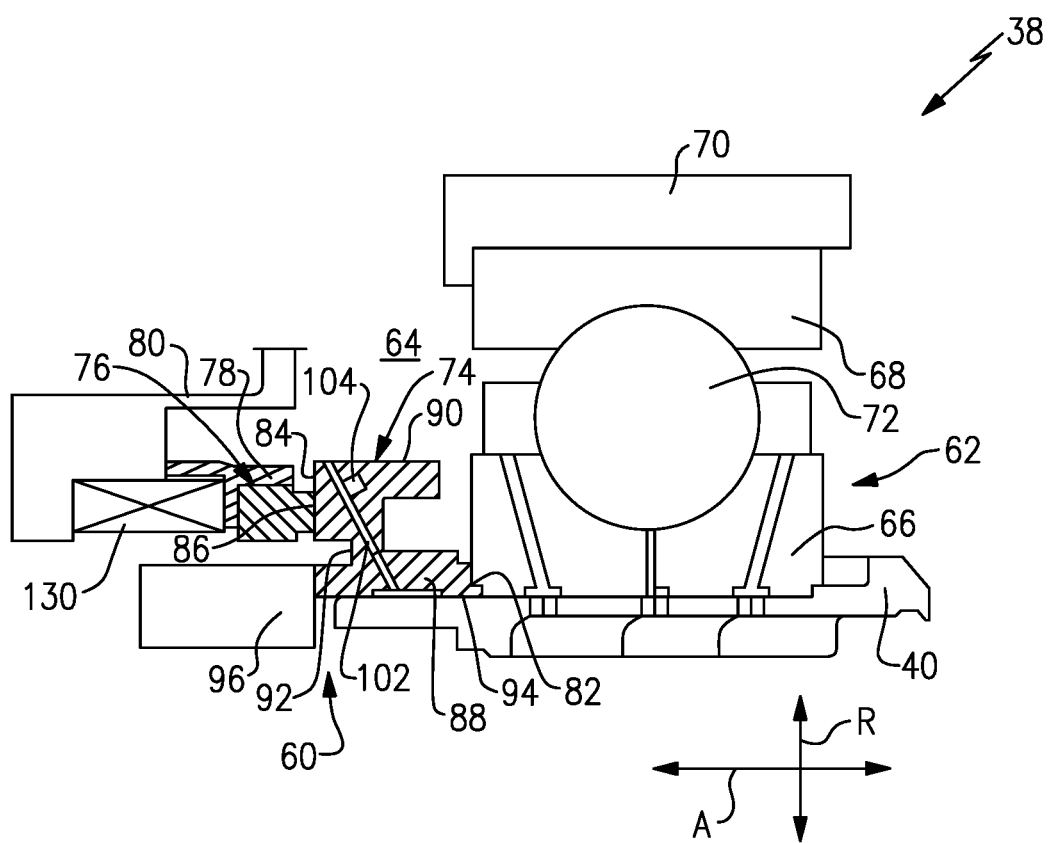
FIG. 2 is a side cross-sectional view of one example of a bearing and a seal assembly with a flow damper.

FIG. 2 shows an example of a bearing system 38 for the inner shaft 40 that includes a seal assembly 60. This is merely one example location for the seal assembly 60 and it should be understood that the seal assembly 60 could be used with any bearing system 38 within the gas turbine engine 20 or could be associated with the outer shaft 50. The bearing system 38 includes at least one bearing 62 positioned within a bearing chamber or compartment 64. The seal assembly 60 is configured to seal the bearing compartment 64 and maintain fluid pressure, particularly oil pressure, in the bearing compartment 64 during operation of the engine 20. The bearing 62 includes an inner race 66 fixed to the shaft 40 and an outer race 68 fixed to an engine static structure 70. A bearing rolling element 72 is supported between the inner 66 and outer 68 races to support the shaft 40 for rotation relative to the engine static structure 70.

The seal assembly 60 provides sealing for the bearing compartment 64 and includes a seal runner 74 that rotates about the engine central longitudinal axis A and a seal 76 that is associated with a seal support 78. The seal 76 and seal runner 74 are configured to cooperate with one another to establish a seal for the bearing compartment 64, and in particular to keep oil in the bearing compartment 64, which, in turn, maintains oil pressure in the bearing compartment 64. In this example, the seal 76 is mounted to a static structure 80 that is associated with the seal support 78, and therefore does not rotate during operation of the engine 20. The seal 76 may be circumferentially segmented and may be made of a carbon (C) material, however other materials come within the scope of this disclosure.

In one example, the seal 76 comes into contact with the seal runner 74 during operation of the engine 20. The seal 76 may be biased into axially compressive engagement with the seal runner 74 via one or more factors including pressure bias and spring loading. In one example, a spring 130 (e.g., a coil spring) provides the required bias. There may be a circumferential array of such springs about the axis A each under axial compression. Thus, the seal 76 and seal runner 74 are in a close relationship, and generate heat during operation of the gas turbine engine 20. Thus, this disclosure provides advanced cooling for the seal assembly 60.

In one example, the seal runner 74 has an aft end face 82 and a fore end face 84 that faces an aft face 86 of the seal 76. The seal runner 74 also includes a radially inner portion 88 and a radially outer portion 90 that are connected by a radial extending center body portion 92. The radially inner portion 88 has an innermost peripheral surface 94 of the seal runner 74 that is received on the shaft 40. The aft end face 82 of the radially inner portion 88 abuts directly against a fore end of the inner race 66 of the bearing 62 and the fore end face 84 abuts against a static structure 96. The fore end face 84 of the radially outer portion 90 abuts against the aft face 86 of the seal 76 and the aft end face 82 of the radially outer portion 90 is spaced apart from the bearing 62. The radial extending center body portion 92 connects the radially inner 88 and radially outer 90 portions at a location between the fore end face 84 and the aft end face 82.

Cooling flow to these face seals in some embodiments is dependent on tuning flow paths within and around the seal to be most effective at specific conditions based on engine running speed. It is desirable to provide more cooling to the seal during high speed/high temperature conditions; however, the speed of the rotating components tends to flow the fluid faster during these conditions and less heat dissipation is achieved from the seal and seal runner. Thus, it is challenging to provide a desired amount of cooling under these operating conditions without having additional control systems to provide for different fluid flow at different flight conditions.

The subject disclosure provides the seal runner 74 with at least one internal passage 102 to direct cooling fluid flow through the seal runner 74, and includes restriction 104 that is associated with the internal passage 102 to restrict flow through the internal passage 102 in response to an engine condition. In one example shown in FIGS. 3-4, the restriction 104 comprises a resilient member 106 such as a spring. The restriction 104 may also include a damper 108 associated with the resilient member 106. The resilient member 106 moves the damper 108 from an initial position to a restricted position to reduce a flow rate of fluid flowing through the internal passage 102 in response to the engine condition. In one example, the damper is made from light weight material and can be a metallic material or a resilient/flexible material.

Figure 3:
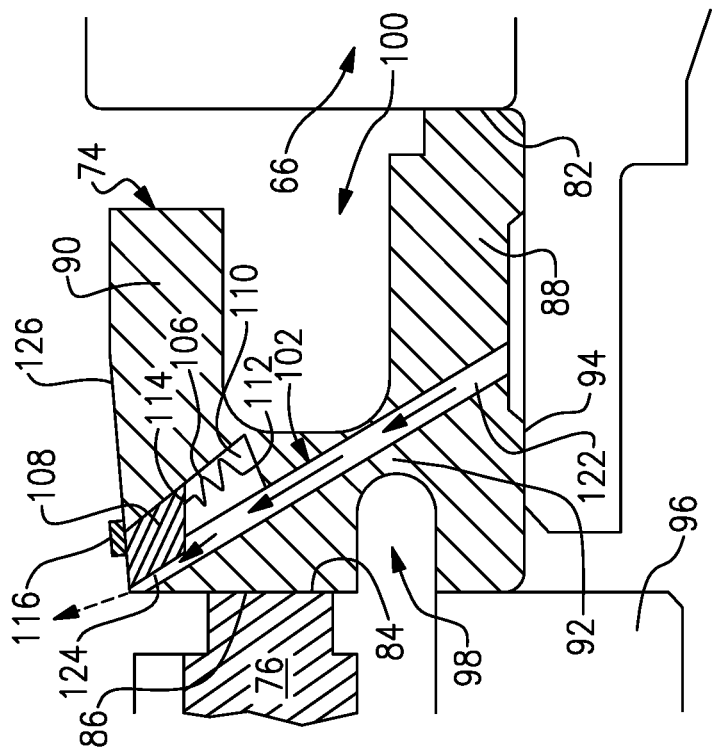
FIG. 3 is an enlarged view of the flow damper of FIG. 2 in a first position.
Figure 4:
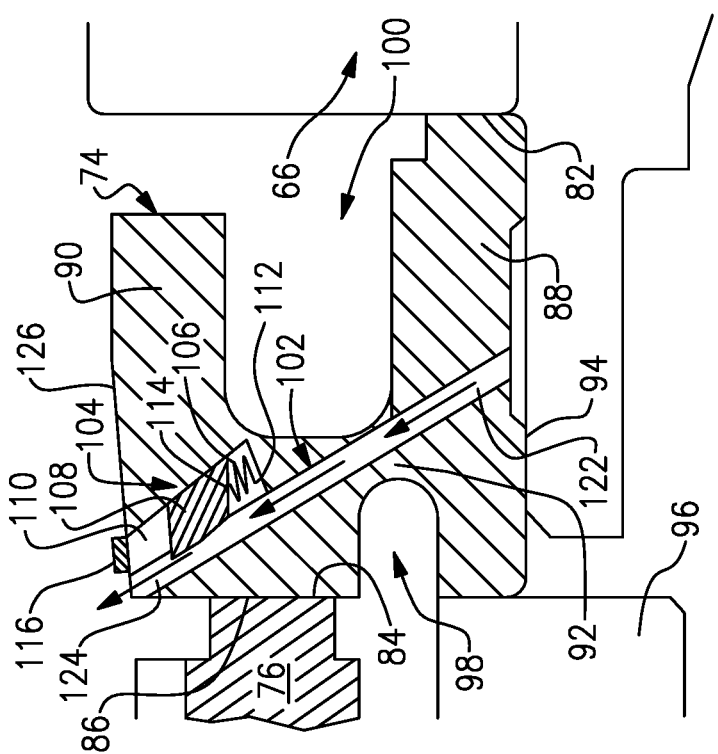
FIG. 4 is an enlarged view of the flow damper of FIG. 2 in a second position.

The shaft 40 and the seal runner 74 rotate a first speed during a low-speed engine operating condition as shown in FIG. 3, such as a cruise condition for example, and rotate at a second speed higher than the first speed during a high-speed engine operating condition, such as a take-off condition as shown in FIG. 4 for example. In one example, when the engine condition corresponds to the high-speed engine operating condition, the damper 108 is moved to the restricted position. Fluid exits an outlet of the internal passage 102 at a first flow rate when the damper 108 is in the initial position and the fluid exits the outlet at a second flow rate less than the first flow rate when the damper 108 is in the restricted position. Thus, during high-speed engine operating conditions the cooling flow is restricted through the seal runner 74 to improve heat absorption of the oil and thus cooling efficiency of the system.

In one example, the resilient member 106 is enclosed within a pocket 110 formed within the seal runner 74. The resilient member 106 includes a first end 112 held fixed within the pocket 110 and a second end 114 that is associated with the damper 108. The resilient member 106 is biased to the initial position shown in FIG. 3, and the damper 108 moves to the restricted position when a rotational speed of the associated rotating components overcomes a biasing force of the resilient member 106. The damper 108 blocks a portion of the internal passage 102 when in the restricted position to reduce a cross-sectional area of the internal passage 102 from a first area to a second area less than the first area.

In one example, a stop 116 is used to prevent the damper 108 from completely blocking the passage 102. The stop 116 can also serve to prevent the resilient member 106 from overextending. The stop 116 can comprise a tab, flange, or fastening element that is associated with the seal runner 74 at a distal end of the pocket 110 and may be used as part of the assembly process.

As discussed above, the seal assembly 60 may be circumferentially segmented about the axis A. The seal assembly 60 can also include internal passages 102 with restrictions in some or all of the segments. In one example, the internal passage 102 has a first end 122 in fluid communication with innermost peripheral surface 94 of the seal runner 74 and a second end 124 in fluid communication with a radially outer surface 126 of the seal runner 74. The pocket 110 is open to the second passage 102 at a location between the first 122 and second 124 ends such that the damper 108 can extend to at least partially block the passage 102 when in the restricted position.

The subject disclosure provides for a restriction device that is incorporated into the seal runner to vary flow rate through the seal runner. In one example, the device is spring loaded and acts with the outward acting force of the associated rotating components to move radially outboard at higher engine speeds to restrict the flow passage. This restricts the overall fluid flow and increases heat absorption. This also provides seal durability improvement due to optimized cooling flow at high-speed conditions, such as a take-off condition for example, versus a lower speed condition, such as a cruise condition for example, without having to control flow and make other compromises in the overall system.

In another embodiment the damper and resilient member are reversed such that when in high speed operation the damper acts in compression on the resilient member rather than in tension, however it can be understood that a similar effect in restricting fluid flow is achieved in high speed operation versus low speed operation.

In this disclosure "axially" refers to a direction substantially parallel to the engine central longitudinal axis A, and "radially" refers to directions normal thereto. The radial direction R and the axial direction A are labeled in FIG. 2 for ease of reference. It should be understood that terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine component comprising:
a first member;
a second member rotatable relative to the first member about an axis;
a seal assembly that includes a seal supported by the first member and a seal runner that rotates with the second member relative to the seal, and wherein the seal runner includes at least one internal passage to direct cooling fluid flow through the seal runner; and a restriction associated with the at least one internal passage to restrict flow through the at least one internal passage in response to an engine condition such that fluid flows out of an outlet of the at least one internal passage at a first flow rate when the restriction is in an initial position and wherein the fluid flows out of the outlet at a second flow rate less than the first flow rate when in the restricted position.

2. The gas turbine engine component according to claim 1, wherein the restriction comprises a resilient member.

3. The gas turbine engine component according to claim 2, including a damper associated with the resilient member, wherein the resilient member moves the damper from the initial position to the restricted position to reduce a flow rate of fluid flowing through the at least one internal passage in response to the engine condition.

4. The gas turbine engine component according to claim 3, wherein the second member rotates a first speed under a low-speed engine operating condition and rotates at a second speed higher than the first speed under a high-speed engine operating condition, and wherein the engine condition corresponds to the high-speed engine operating condition such that fluid exits the outlet of the at least one internal passage at the first flow rate when the damper is in the initial position and wherein the fluid exits the outlet at the second flow rate less than the first flow rate when the damper is in the restricted position.

5. A gas turbine engine component comprising: at least one bearing to support a shaft for rotation about an engine axis, wherein the at least one bearing is positioned within a bearing compartment; and a seal assembly to provide sealing for the bearing compartment, wherein the seal assembly includes a seal supported by a first member, a seal runner supported by a second member that rotates relative to the first member about the engine axis, wherein the seal runner includes at least one internal passage to direct cooling fluid flow through the seal runner, and a restriction associated with the at least one internal passage to restrict flow through the at least one internal passage in response to an engine condition such that fluid flows out of an outlet of the at least one internal passage at a first flow rate when the restriction is in an initial position and wherein the fluid flows out of the outlet at a second flow rate less than the first flow rate when in the restricted position.

6. The gas turbine engine component according to claim 5, wherein the restriction comprises a resilient member.

7. The gas turbine engine component according to claim 6, including a damper associated with the resilient member, wherein the resilient member moves the damper from an initial position to a restricted position to reduce a flow rate of fluid flowing through the at least one internal passage in response to the engine condition.

8. The gas turbine engine component according to claim 7, wherein the resilient member is enclosed within a pocket formed within the seal runner, and wherein the resilient member includes a first end held fixed within the pocket and a second end that is associated with the damper.

9. The gas turbine engine component according to claim 8, wherein the resilient member is biased to the initial position, and wherein the damper moves to the restricted position when a rotational speed of the second member overcomes a biasing force of the resilient member, and including a stop to prevent the damper from completely blocking the at least one internal passage when in the restricted position.

10. The gas turbine engine component according to claim 9, wherein the second member rotates a first speed under a low-speed engine operating condition and rotates at a second speed higher than the first speed under a high-speed engine operating condition, and wherein the engine condition corresponds to the high-speed engine operating condition such that fluid exits an outlet of the at least one internal passage at a first flow rate when the damper is in the initial position and wherein the fluid exits the outlet at a second flow rate less than the first flow rate when the damper is in the restricted position.

11. A method comprising:
providing a seal assembly that includes a seal supported by a first member and a seal runner supported by a second member that rotates relative to the first member about an engine axis;
forming at least one internal passage in the seal runner to direct cooling fluid flow through the seal runner; and
associating a restriction with the at least one internal passage to restrict flow through the at least one internal passage in response to an engine condition such that fluid flows out of an outlet of the at least one internal passage at a first flow rate when the restriction is in an initial position and wherein the fluid flows out of the outlet at a second flow rate less than the first flow rate when in the restricted position.

12. The method according to claim 11, wherein the restriction comprises a resilient member and a damper associated with the resilient member, and including using the resilient member to move the damper from the initial position to the restricted position to reduce a flow rate of fluid flowing through the at least one internal passage in response to the engine condition.

13. The gas turbine engine component according to claim 12, wherein the second member rotates a first speed under a low-speed engine operating condition and rotates at a second speed higher than the first speed under a high-speed engine operating condition, and wherein the engine condition corresponds to the high-speed engine operating condition such that fluid exits the outlet of the at least one internal passage at the first flow rate when the damper is in the initial position and wherein the fluid exits the outlet at the second flow rate less than the first flow rate when the damper is in the restricted position.

14. The method according to claim 11, wherein the restriction is positioned at least partially within the at least one internal passage.

15. A gas turbine engine component comprising: a first member; a second member rotatable relative to the first member about an axis; a seal assembly that includes a seal supported by the first member and a seal runner that rotates with the second member relative to the seal, and wherein the seal runner includes at least one internal passage to direct cooling fluid flow through the seal runner; and a restriction positioned at least partially within the at least one internal passage to restrict flow through the at least one internal passage in response to an engine condition such that fluid flows out of an outlet of the at least one internal passage at a first flow rate when the restriction is in an initial position and wherein the fluid flows out of the outlet at a second flow rate less than the first flow rate when in the restricted position.

16. The gas turbine engine component according to claim 15, wherein the restriction comprises a resilient member that is enclosed within a pocket formed within the seal runner.

17. The gas turbine engine component according to claim 16, including a damper associated with the resilient member, wherein the resilient member moves the damper from an initial position to a restricted position to reduce a flow rate of fluid flowing through the at least one internal passage in response to the engine condition, and wherein the resilient member includes a first end held fixed within the pocket and a second end that is associated with the damper.

18. The gas turbine engine component according to claim 17, wherein the resilient member is biased to the initial position, and wherein the damper moves to the restricted position when a rotational speed of the second member overcomes a biasing force of the resilient member.

19. The gas turbine engine component according to claim 18, wherein the damper blocks a portion of the at least one internal passage when in the restricted position to reduce a cross-sectional area of the at least one internal passage from a first area to a second area less than the first area.

20. The gas turbine engine component according to claim 19, including a stop to prevent the damper from completely blocking the at least one internal passage.

21. The gas turbine engine component according to claim 16, wherein the at least one internal passage comprises at least a first passage at a radially inner surface of the seal runner, and a second passage having a first end in fluid communication with the first passage and a second end in fluid communication with a radially outer surface of the seal runner, and wherein the pocket is open to the second passage at a location between the first and second ends.

22. The gas turbine engine component according to claim 21, including at least one bearing to support a shaft for rotation about an engine axis, wherein the at least one bearing is positioned within a bearing compartment, and wherein the seal assembly provides sealing for the bearing compartment.

* * * * *